United States Patent [19]
Galasso et al.

[11] Patent Number: 6,142,123
[45] Date of Patent: Nov. 7, 2000

[54] MOTORCYCLE

[75] Inventors: Mario M. Galasso, Newtown; Christopher P. D'Aluisio, Bethel, both of Conn.; Gary Robison, Penrose, N.C.

[73] Assignee: Cannondale Corporation, Bethel, Conn.

[21] Appl. No.: 09/249,000

[22] Filed: Feb. 12, 1999

Related U.S. Application Data

[60] Provisional application No. 60/112,048, Dec. 14, 1998.

[51] Int. Cl.[7] .......................... F02M 51/00; B60K 41/04
[52] U.S. Cl. ................................. 123/486; 477/109
[58] Field of Search .................... 123/486, 478, 123/480, 406.12; 477/109, 111; 701/104, 102; D12/110

[56] References Cited

U.S. PATENT DOCUMENTS

| | | | |
|---|---|---|---|
| 4,000,666 | 1/1977 | Ito et al. .............................. 74/604 |
| 4,006,724 | 2/1977 | Carter .................................. 123/198 |
| 4,254,746 | 3/1981 | Chiba et al. ........................... 123/52 |
| 4,264,961 | 4/1981 | Nishimura et al. ................... 364/510 |
| 4,270,414 | 6/1981 | Tellert ................................. 477/103 |
| 4,275,694 | 6/1981 | Nagaishi ............................. 123/463 |
| 4,331,212 | 5/1982 | Tsuboi ................................ 180/230 |
| 4,354,469 | 10/1982 | Sato .................................. 123/460 |
| 4,364,340 | 12/1982 | Kimura ................................ 123/55 |
| 4,373,491 | 2/1983 | Knapp ................................. 123/472 |
| 4,375,204 | 3/1983 | Yamamoto ............................ 123/52 |
| 4,412,515 | 11/1983 | Fritzenwenger ....................... 123/198 |
| 4,416,241 | 11/1983 | Knapp et al. ......................... 123/494 |
| 4,444,013 | 4/1984 | Inoue et al. ........................... 60/605 |
| 4,468,957 | 9/1984 | Sumal .................................. 73/118 |
| 4,474,144 | 10/1984 | Tanaka et al. ......................... 123/52 |
| 4,475,486 | 10/1984 | Kessler ................................. 123/52 |
| 4,475,617 | 10/1984 | Minami et al. ........................ 180/219 |
| 4,494,405 | 1/1985 | Oosuga et al. ......................... 73/118 |
| 4,495,773 | 1/1985 | Inoue et al. ........................... 60/605 |
| 4,495,802 | 1/1985 | Kashiwaya et al. .................... 73/118 |
| 4,509,613 | 4/1985 | Yamaguchi ........................... 180/219 |
| 4,535,746 | 8/1985 | Otani et al. ........................... 123/556 |
| 4,545,341 | 10/1985 | Corey et al. ........................... 123/192 |
| 4,589,381 | 5/1986 | Takayama ............................. 123/52 |
| 4,616,608 | 10/1986 | Shiga ................................... 123/192 |
| 4,719,891 | 1/1988 | Porth et al. ........................... 123/494 |
| 4,739,651 | 4/1988 | Smith ................................... 73/118.2 |
| 4,742,710 | 5/1988 | Porth et al. ........................... 73/118.2 |

(List continued on next page.)

FOREIGN PATENT DOCUMENTS

| | | |
|---|---|---|
| 0 531 858 A1 | 9/1993 | European Pat. Off. . |
| 30 19 544 A1 | 11/1981 | Germany . |
| 35 39 013 A1 | 5/1987 | Germany . |
| 59-59522 | 4/1984 | Japan . |
| 61-255259 | 11/1986 | Japan . |
| 63-100269 | 2/1988 | Japan . |
| 63-63577 | 4/1988 | Japan . |
| 63-183365 | 11/1988 | Japan . |
| 1-232158 | 9/1989 | Japan . |
| 1-289779 | 11/1989 | Japan . |
| 2-216380 | 8/1990 | Japan . |
| 2-256864 | 10/1990 | Japan . |
| 2 082 252 | 3/1982 | United Kingdom . |

OTHER PUBLICATIONS

Dynojet Internet advertisement (http:powercommander-.com/default.htm) printed Oct. 18, 1999.

Cycle News, Riding Impression 2001 BMW F650GS, Apr. 26, 2000. p. 20.

*Primary Examiner*—Henry C. Yuen
*Assistant Examiner*—Arnold Castro
*Attorney, Agent, or Firm*—Pennie & Edmonds LLP

[57] ABSTRACT

The present invention is directed towards a motorcycle or off-road use with an improved engine, air inlet, exhaust and engine control management. The engine is an improved four-stroke engine with a monocoque cylinder and crank case. The air inlet has been moved to the head tube of the motorcycle frame. The engine is reverse flow with the exhaust coming out the rear side and being shortened to less than about 50 inches. The engine control management has been modified to include an ignition interrupt, gear based ignition timing and after market tuning capabilities.

10 Claims, 15 Drawing Sheets

U.S. PATENT DOCUMENTS

| | | | |
|---|---|---|---|
| 4,759,213 | 7/1988 | Porth et al. | 73/118.2 |
| 4,759,320 | 7/1988 | Fujii et al. | 123/52 |
| 4,760,703 | 8/1988 | Minami et al. | 60/605.1 |
| 4,761,995 | 8/1988 | Ohta et al. | 73/118.2 |
| 4,776,313 | 10/1988 | Freismuth et al. | 123/470 |
| 4,793,293 | 12/1988 | Minami | 123/41.7 |
| 4,796,719 | 1/1989 | Shiratsuchi | 180/219 |
| 4,799,470 | 1/1989 | Honda et al. | 123/470 |
| 4,800,852 | 1/1989 | Kandler | 123/192 |
| 4,805,564 | 2/1989 | Hudson, Jr. | 123/52 |
| 4,828,069 | 5/1989 | Hatsuyama | 180/219 |
| 4,829,941 | 5/1989 | Hitomi et al. | 123/52 |
| 4,870,857 | 10/1989 | Smith | 73/118.2 |
| 4,898,125 | 2/1990 | Ampferer | 123/52 |
| 4,909,222 | 3/1990 | Takano et al. | 123/470 |
| 4,919,086 | 4/1990 | Shillington | 123/52 |
| 5,003,933 | 4/1991 | Rush, II et al. | 123/52 |
| 5,005,532 | 4/1991 | Shillington | 123/52 |
| 5,014,654 | 5/1991 | Ishibashi | 123/52 |
| 5,022,371 | 6/1991 | Daly | 123/468 |
| 5,029,569 | 7/1991 | Cullen et al. | 123/494 |
| 5,038,731 | 8/1991 | Shimada | 123/192 |
| 5,065,841 | 11/1991 | Takagaki | 184/6.18 |
| 5,079,969 | 1/1992 | Kato et al. | 477/109 |
| 5,088,464 | 2/1992 | Meaney | 123/478 |
| 5,094,194 | 3/1992 | Rush, II et al. | 123/52 |
| 5,101,792 | 4/1992 | Koch | 123/456 |
| 5,138,983 | 8/1992 | Daly | 123/52 |
| 5,150,669 | 9/1992 | Rush, II et al. | 123/52 |
| 5,174,260 | 12/1992 | Nonogawa et al. | 123/432 |
| 5,174,263 | 12/1992 | Meaney | 123/406.47 |
| 5,186,140 | 2/1993 | Ueda et al. | 123/308 |
| 5,203,299 | 4/1993 | Ueda | 123/308 |
| 5,205,244 | 4/1993 | Nakamura et al. | 123/52 |
| 5,205,261 | 4/1993 | Betts, Jr. et al. | 123/494 |
| 5,218,885 | 6/1993 | Nakano et al. | 74/591 |
| 5,259,356 | 11/1993 | Karlsson et al. | 123/541 |
| 5,273,010 | 12/1993 | Elder | 123/52 |
| 5,357,931 | 10/1994 | Semence | 123/456 |
| 5,383,356 | 1/1995 | Zurek et al. | 73/118.2 |
| 5,446,665 | 8/1995 | Adrian et al. | 364/431.04 |
| 5,465,699 | 11/1995 | Voigt | 123/470 |
| 5,469,820 | 11/1995 | Data et al. | 123/192.2 |
| 5,477,819 | 12/1995 | Kopec | 123/184.42 |
| 5,507,265 | 4/1996 | Ichikawa et al. | 123/491 |
| 5,526,787 | 6/1996 | Pallett | 123/399 |
| 5,560,446 | 10/1996 | Onishi | 180/219 |
| 5,575,247 | 11/1996 | Nakayama et al. | 123/184.21 |
| 5,608,632 | 3/1997 | White | 364/431.51 |
| 5,609,658 | 3/1997 | Takemura et al. | 55/385.3 |
| 5,615,642 | 4/1997 | Coughlin | 123/54.4 |
| 5,615,657 | 4/1997 | Yoshizawa | 123/494 |
| 5,631,412 | 5/1997 | Tomisawa | 73/118.2 |
| 5,638,784 | 6/1997 | Ohsuga et al. | 123/184.34 |
| 5,653,200 | 8/1997 | Hafner et al. | 123/184.21 |
| 5,664,533 | 9/1997 | Nakayama et al. | 123/184.42 |
| 5,682,859 | 11/1997 | Wakeman | 123/470 |
| 5,688,299 | 11/1997 | Goodwin | 55/385.3 |
| 5,696,321 | 12/1997 | Igarashi et al. | 73/202.5 |
| 5,715,784 | 2/1998 | Okui et al. | 123/192.2 |
| 5,729,974 | 3/1998 | Takashima | 60/313 |

MOTORCYCLE

CROSS REFERENCE TO RELATED APPLICATION

This application claims priority from provisional application Ser. No. 60/112,048, filed Dec. 14, 1998.

FIELD OF THE INVENTION

This invention generally relates to two-wheeled vehicles, and more particularly to motorcycles.

BACKGROUND OF THE INVENTION

Off-road motorcycles are well-known forms of transportation that are built for use on rough terrain and riding them usually includes maneuvering through numerous curves and executing jumps. Thus, the responsiveness of the bike to the rider is critical to the bike having the proper performance. These motorcycles are built to be rugged and maneuverable.

Referring to FIGS. 1 and 2, conventional off-road motorcycles 10 generally include a frame 12, a front-suspension 13, steering assembly 14 that includes a front wheel 16, a fuel tank 18, a two-stroke engine 20, a seat 21, and a rear-suspension assembly 22 that includes a rear wheel 24. The motorcycle 10 further includes a brake assembly that includes front and rear brake cylinders 25.

The frame 12 shown is an aluminum frame and includes rearwardly divergent spars 26 that extend from a head tube 28 and an engine support assembly 30. The engine support assembly 30 is formed of tubular members that are fixed to the spars 26 and extend downwardly therefrom to form a space 32 for receiving the engine 20. The engine 20 is bolted to the engine support assembly 30 and spars 26 within the space 32.

Referring to FIG. 1, fuel tank 18 stores fuel to be burned by the engine 20. In general, conventional fuel tanks are positioned on the frame 12 between the head tube 28 and the seat 21. An air filter (not shown) is necessary to prevent dust and dirt from getting sucked into the engine 20 where it can cause harm.

Due to the location of the carburetor and air box 40 behind engine 20, the air filter is typically located below and behind the fuel tank 18. The fuel tank disclosed in U.S. Pat. No. 4,577,719 issued to Nomura et al. discloses a main fuel tank disposed above the engine, and a separate auxiliary tank formed below the seat and behind the engine. The auxiliary tank is connected to the main fuel tank by a pipe. The air filter is located beneath the fuel tank.

Inspection and replacement of the air filter is often necessary, because these types of motorcycles are ridden in the dirt and when air filter gets too dirty, it impairs engine performance. Easy access to the air filter is desired.

Several configurations afford improved access to the air filter. For example, U.S. Pat. No. 4,648,474 issued to Shinozaki et al. discloses a fuel tank including a forwardly facing U-shaped cavity. An air filter is located within the cavity of the fuel tank. The fuel tank is located above and on the exterior of the sides of the main frame. U.S. Pat. No. 4,653,762 issued to Nakamura et al. discloses a main fuel tank of a generally U-shape section straddling the main frame so that it downwardly extends toward an engine. The main fuel tank is formed with an open space in its rear upper portion that extends partially vertically through the tank. An air cleaner is disposed within the space, and covered with a detachable cover. Both of the aforementioned tank configurations are for road motorcycles not off-road motorcycles.

Thus, these tanks are configured for larger fuel capacities than that desired for off-road motorcycles, and make off-road motorcycles more difficult to maneuver.

Referring to FIGS. 1 and 2, the engine 20 of a typical off-road motorcycle includes a cylinder 38 and a carburetor and air box 40, one of which is shown. The carburetor 40 mixes fuel with air, and this mixture is fed into the engine 20 and burned. The carburetor 40 is located behind the engine cylinder 38. A kick start 42 extends from the rear of one side of the engine 20 for starting the engine.

Most serious off-road motorcycles have two-stroke engines, which provide excellent power output. When installed, the cylinders 38 of two-stroke engines extend vertically and terminate so that they are spaced from the spars 26. As a result, when repair of the engine is necessary, the two-stroke engine is removed sideways from the frame.

Some off-road motorcycles have four-stroke engines, which are typically less powerful than two-stroke engines for the same displacement. However, four-stroke engines are significantly cleaner, more efficient and quieter. In the 1950's most motocross motorcycles had four-stroke engines. An early off-road, four-stroke, motorcycle was Rick Johnson's 1981–1984 Factory Team Bike built by Team Yamaha and Pro-Tec. Other four-stroke motorcycles are the Yamaha YZ400 and the ATK 350/605 and 600. All of these four-stroke bikes have steel frames and use carburetors for fuel/air mixture. In order to provide the same power as a two-stroke engine, the cylinder of the four-stroke engine must be significantly larger. Due to the size and weight of the four-stroke engine, the frame is made taller and the bike is heavier, which makes the bike more difficult to ride.

Steel off-road frames typically have a single spar extending from the head tube. The engine support assembly is fixed to the spar, and extends therebelow to form the space 32. In order to make the four-stroke engine fit in this type of frame, the spar is angled upward with respect to the head tube 28 so that the space 32 is large enough to accommodate the entire engine. This allows the engine to be removed sideways from the frame. However, enlarging the space 32 may cause the seat 21 to be higher than in the other configuration. Since a higher seat may make straddling the motorcycle while standing and maneuvering the motorcycle more difficult, this configuration is undesirable.

Due to the performance requirements of off-road motorcycles, they are generally equipped with a rugged rear suspension 44 capable of cushioning the rider from jarring. Typically, the rear suspension 44 of an off-road motorcycle consists of a swing arm 46 that is pivotally attached to the frame 12. The rear wheel 24 is rotatably mounted at the free ends of the swing arm 46. A shock 48 is connected between the swing arm 46 and the frame 12. Since the carburetor and air box 40 are located behind the engine 20, their presence greatly dictates the configuration of the shock 48 connection to the swing arm and main frame.

In order to obtain the desired performance, one arrangement provides a linkage 50 between the lower surface of the swing arm 46 and the shock 48. When the free ends of the swing arm 46 move toward the frame 12, the linkage moves and compresses the shock 48. Consequently, the shock biases the free ends of the swing arm 46 away from the frame 12. The linkage 50 allows the attachment point of the shock 48 to the frame 12 and the shock 48 itself to extend substantially vertically upward, such that it avoids the carburetor and air box 40. Since this arrangement requires the linkage 50, it is more complex than a direct connection of the shock to the swing arm. Therefore, it is undesirable.

Another arrangement directly connects the shock 48 to the swing arm 46. However in order to avoid the carburetors and air box 40, the shock must be off-set from the central plane of the motorcycle. The shock is coupled to either the right of left arm of the swing arm and, thus, loads and stresses that swing arm unevenly. Typically the swing arm must then be built to withstand these conditions.

Furthermore, this configuration requires the frame to be configured to compensate for the lack of symmetry of the shock mount and the shock loads. This will not maximize the maneuverability of the motorcycle. Another alternative is to use two shocks connected to each of the arms of the swing arm. However, this tends to make the motorcycle wide through the foot peg area and from a simplicity stand point, fewer parts would be more desirable.

Therefore, in order to overcome the shortcomings of the prior art, the object of the invention herein is to provide improved off-road motorcycle frame configuration and four-stroke engine.

SUMMARY OF THE INVENTION

These desirous and advantageous features are now provided by the present invention, which relates to a motorcycle comprising an improved frame configuration and four-stroke engine. This application is directed to a motorcycle having a frame, rear suspension and electronically controlled four-stroke engine such as that disclosed in co-pending U.S. application Ser. No. 09/073,925, filed on May 7, 1998, the entirety of which is incorporated by reference herein.

The present invention is directed to a motorcycle for off-road use having a longitudinally extending central plane, wherein the motorcycle comprises an engine having a cylinder, a frame, and an exhaust pipe. The frame comprises a main frame including a head tube, first and second spars extending from the head tube, and first and second swing arm mounts on the spars. The head tube includes two apertures to provide an air intake passage therethrough for the engine air inlet. The frame further includes an engine frame, which is releasably attached to the main frame to provide easy access to the engine. The engine frame includes a first end pivotally or removably coupled to the main frame at approximately the swing arm mount attachment point and a second end releasably coupled to the spars approximate the head tube so that the engine frame is movable between an in or out position. The engine frame can also include first and second bolt rails, each bolt rail is pivotally or removably attached to the respective swing arm mount at the first end and releasably coupled to the main frame at the second end. The engine frame can further include first and second down tubes, each down tube is attached to the lower surface of the respective spar at longitudinally spaced locations. Each bolt rail extends from the associated swing arm mount to the associated down tube. Moreover, the spars include a longitudinally extending center plane that defines an angle with a horizontal plane that is less than 45 degrees.

An exhaust pipe is coupled to the engine to provide a passage for the engine's exhaust. According to the present invention, the exhaust pipe is coupled to the back end of the engine instead of the front and extends in a substantially backwards direction therefrom for the entire length of the exhaust pipe. Further, the exhaust pipe is preferably less than 50 inches long between the engine and the exhaust tip, including the collector and muffler portions. Most preferably, the exhaust extends from the back end of the engine in a substantially rearward and upward direction for its entire length and is less than about 45 inches. Previously, it was thought that the exhaust had to be longer than about 54 inches in order to provide proper low end torque. However, the applicants found that the low end of the rpm curve was affected very little by the significantly shorter exhaust pipe and that the engine was able to improve power though about 10,000 rpm and maintain a steady power output instead of having a sharp power decline at about 9000 rpm with the longer, 55 inch, pipe.

The present invention is also directed to an improved four-stroke engine that is particularly advantageous for the off-road motorcycle. The engine preferably comprises a single cylinder having an internal volume of between 250 cc and 700 cc and electronically controlled fuel injectors and ignition. The four-stroke motor also has an electronic control management system electronically coupled to the fuel injectors to control the amount and timing of the fuel injection with the air intake and ignition. The electronic control management system preferably is programmable and has more than one control map thereon so that different fuel injection/air intake control maps can be selected by the user for different riding conditions.

In a preferred embodiment of the invention, the electronic control management includes an ignition interrupt, whereby the spark to the engine is stopped during gear changes such that there is little load on the transmission and gear changes are much easier and smoother. In the preferred embodiment, the electronic control management system includes a shift drum position sensor to provide a signal when the user is changing gears and the electronic control management system shuts down the ignition spark during the gear change.

In a preferred embodiment of the invention, the electronic control management includes separate ignition timing for each gear such that the lower gears can have an advanced ignition timing based on piston position such that the bike can accelerate faster through low gears and then a retarded timing for the higher gears where acceleration has slowed. Most preferably, the electronic control management system includes at least one base map (different base maps can be used for different riding conditions) and then a gear modifier to make the ignition timing gear specific based on a signal received from the shift drum position sensor indicative of the engine gear. Preferably, the gear modifier moves ignition timing inversely proportional to the gear, i.e., first gear has the most advanced timing and the highest gear has the most retarded timing. Most preferably, the ignition timing with regard to piston position changes for each gear such that the timing is less advanced or more retarded for each higher gear. As is well known in the art, advanced timing is when the ignition takes place during the up stroke of the piston before the base setting and retarded ignition takes place during the up stroke of the piston, after the piston reaches the base setting and before the piston reaches top-dead-center. Therefore, more advanced ignition means that the piston is further away from top-dead-center in the stroke and the ignition timing is occurring at a higher piston location on the up stroke for each higher gear.

The invention is also directed to an engine with an electronic control management system that allows for after market tuning. While the electronic control management system automatically compensates for air temperature and pressure, consumers may buy after market parts and may want to change the fuel map or ignition timing. The present invention adds a pig tail connector/harness that plugs into a connector on the electronic control management system. When plugged in, the electronic control management system is programed to know that the engine is in either a service or tuning mode and the user can select the mode with a switch on the pig tail connector/harness. In service mode, the electronic control management will signal if there is a malfunction such as bad sensor. In the tuning mode, the engine is started in neutral and then the electronic control management system potentiometer is altered to adjust the idle. Then the engine can be switched into gear to adjust the low, mid and high range fuel characteristics. For example, the engine can be placed into second gear and the potentiometer adjusted to adjust the low range fuel characteristics. Then the engine can be switched into third gear and the potentiometer altered to change the mid range fuel characteristics. Finally, the engine can be switched into fourth gear and the potentiometer altered to change the high range fuel characteristics.

The improved four-stroke engine preferably has only an electronic starter. Preferably, the starter is coupled to a first end of the engine motor balance shaft. By eliminating the standard kick-starter, the frame spars can be significantly improved as stated in more detail below.

The present invention is further directed to a motorcycle comprising a four-stroke engine and an aluminum frame. The four-stroke engine is preferably angled less than 30° from a vertical position and comprises a single cylinder having an internal volume of between 250 cc and 700 cc, a piston received within the cylinder to substantially transverse within the cylinder, and a cylinder head coupled to the cylinder to form a substantially closed volume with the piston. The cylinder head has two inlets on the front end of the engine with corresponding inlet valves for introducing an air/fuel mixture into the closed volume and two outlets on the back side of the engine with corresponding outlet valves for extracting exhaust products from the closed volume. The frame supports the engine and comprises a main frame made of aluminum for supporting the engine and a front wheel, and a swing arm pivotally attached to the main frame for supporting a rear wheel. The engine preferably includes an air intake through the headtube and a substantially vertical inlet plenum for introducing air into the cylinder head. The frame preferably includes a shock pivotally attached to the main frame at a first end and pivotally attached to the swing arm at a second end, wherein the shock is disposed on a central plane of the motorcycle. The shock preferably has a fully extended position where an angle between the shock and a horizontal plane is less than 45°, and a fully compressed position where the angle is less than 30°.

DETAILED DESCRIPTION OF THE PREFERRED EMBODIMENTS

Figure 1:
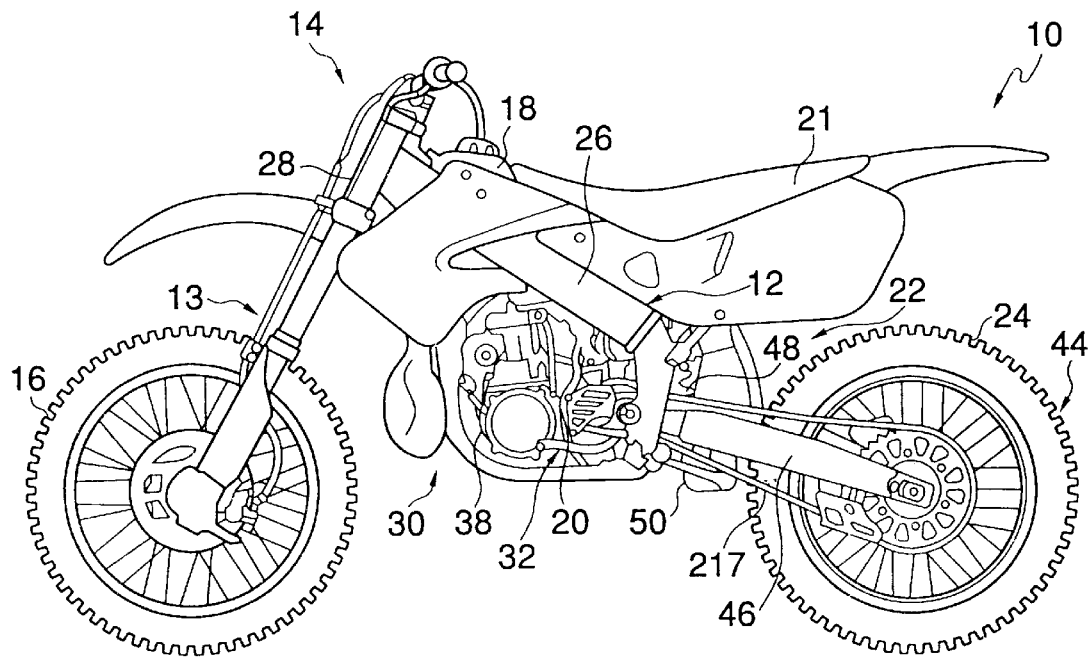
FIG. 1 is a left side view of a prior art off-road motorcycle.
Figure 2:
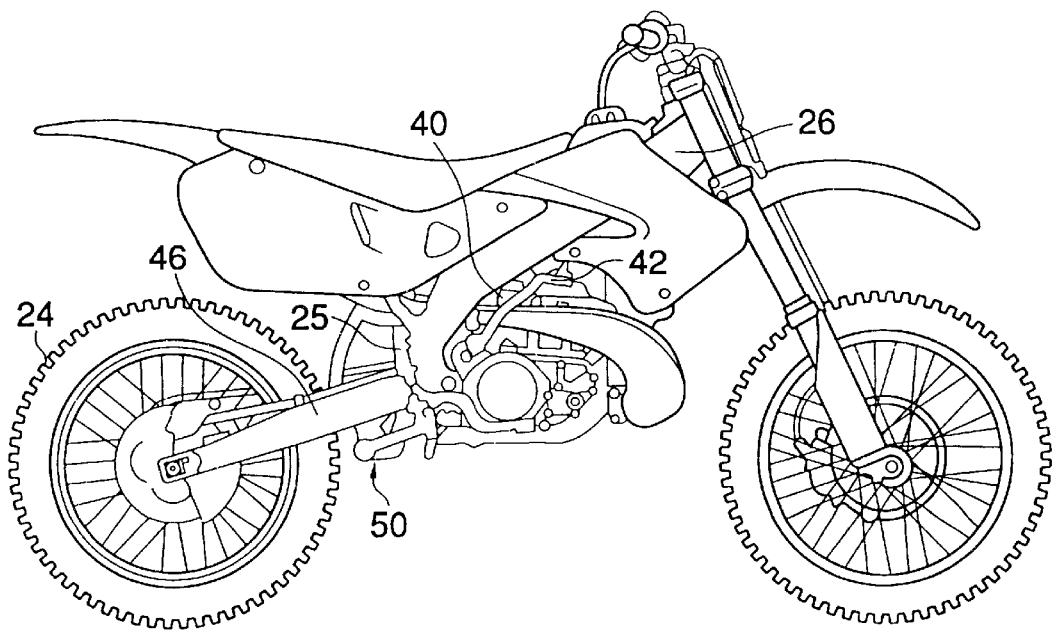
FIG. 2 is a right side view of the prior art off-road motorcycle.
Figure 3:
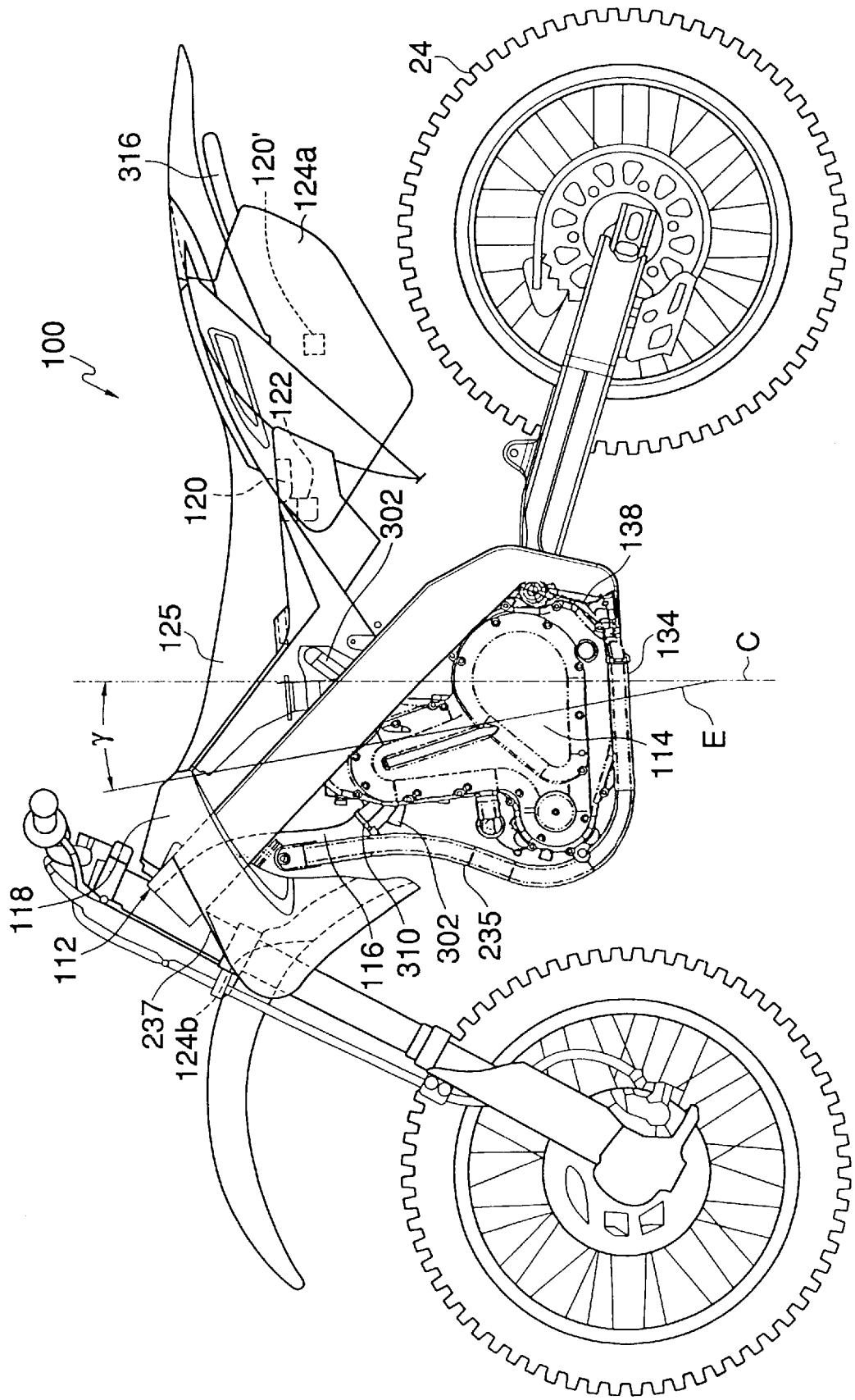
FIG. 3 is a left side view of a motorcycle of the present invention.

Referring to FIG. 3, a motorcycle 100 of the present invention includes a frame 112, an engine 114, an air intake assembly 116 (shown in phantom), a fuel tank 118, a battery 120 (shown in phantom) mounted on the fuel tank or the battery 120' is located on a rear body panel 124a, an engine controller 122 (shown in phantom), a plurality of body panels 124a 124b, and a seat 125. The frame 112 supports the other components of the motorcycle 100.

Figure 4:
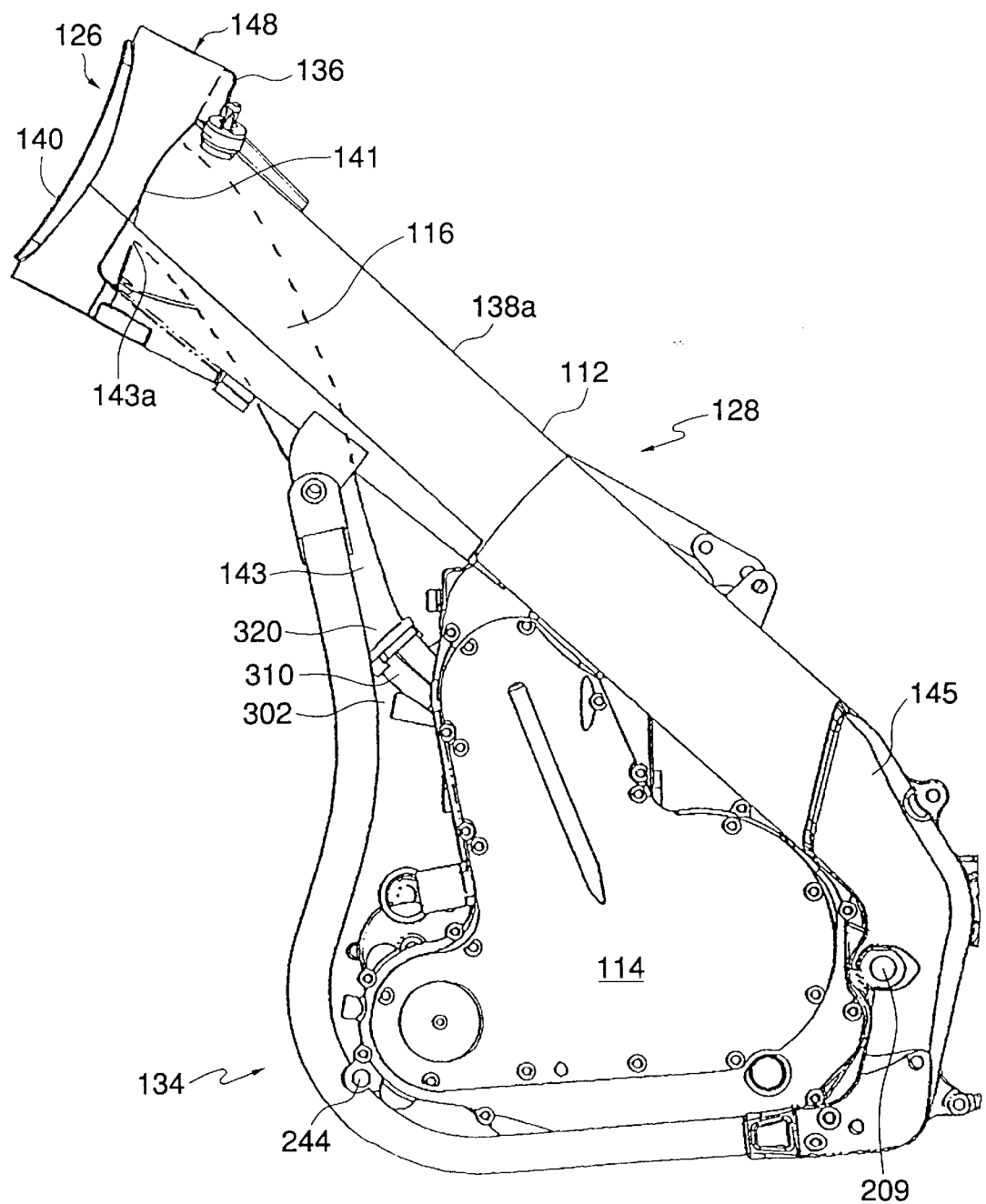
FIG. 4 is a left side view of the off-road motorcycle frame and engine of the present invention.

Referring to FIG. 4, the frame 112 includes a front end 126, a main frame 128, and an engine frame 134. The main frame 128 provides substantial structural support for the components of the motorcycle under static and dynamic loads.

Figure 6:
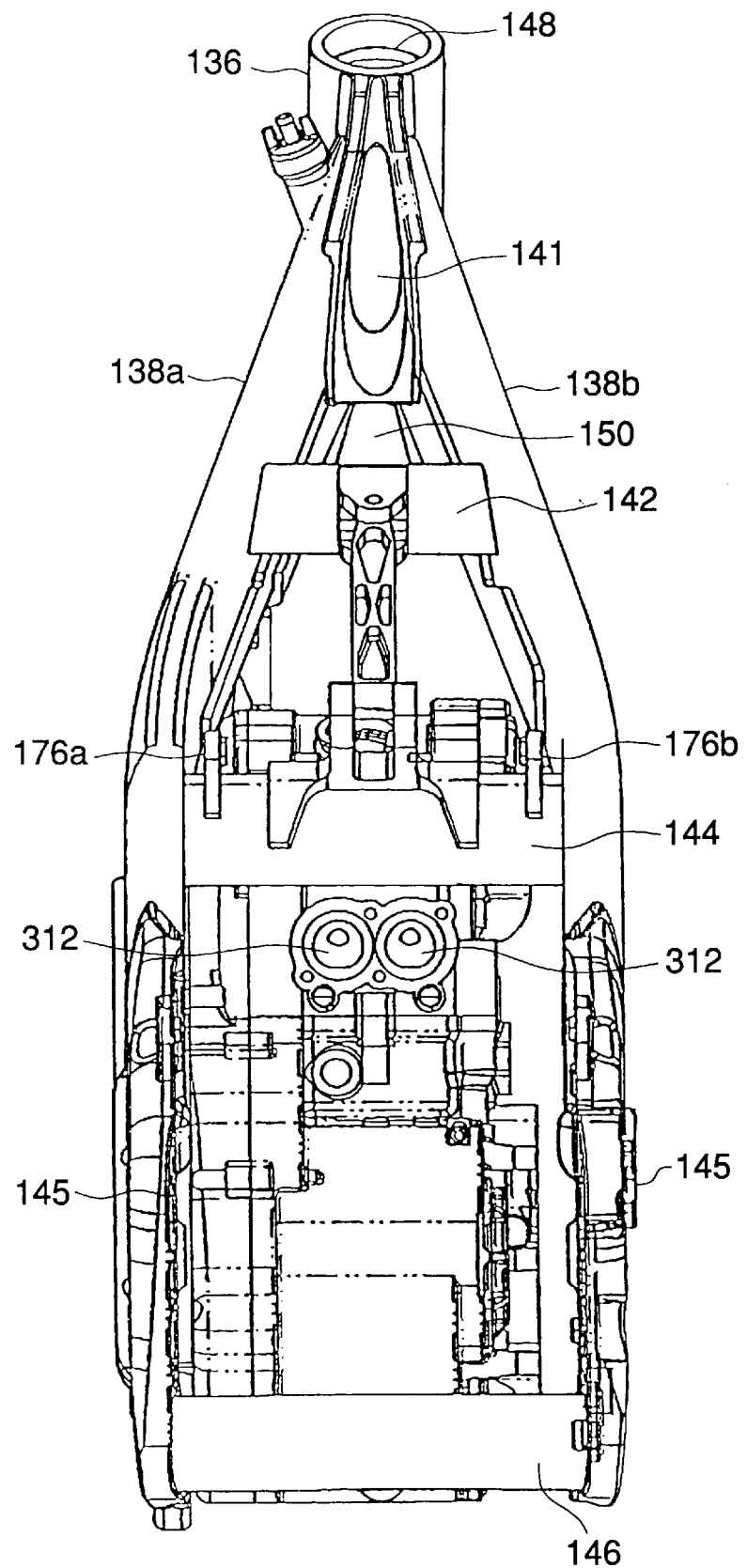
FIG. 6 is a back view of the frame and engine of FIG. 4.

The main frame 128 includes a head tube 136, left and right or first and second spars 138a,b, left and right or first and second swing arm mounts 140a,b, and a plurality of spaced cross members 142, 144, 146 (FIG. 6). The head tube 136 defines a bore 148, there through. The head tube 136 is at the center of the main frame 128. The head tube 136 rotatably supports a steering assembly 14 (as shown in FIG. 3), which is conventional and extends through the bore 148.

Figure 5:
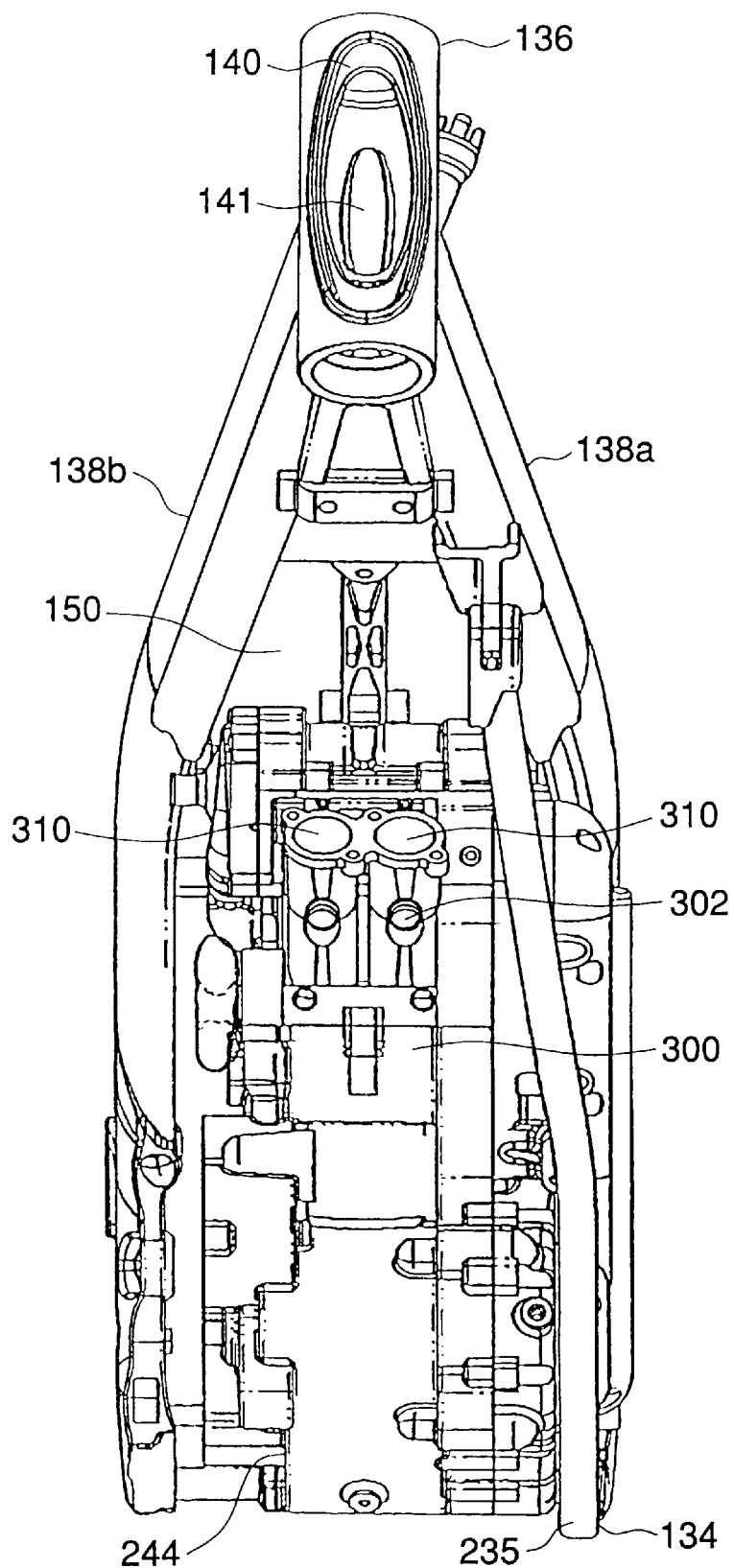
FIG. 5 is a front view of the frame and engine of FIG. 4.

Referring to FIG. 5, the left and right spars 138a,b have a substantially rectangular cross-section and are mirror-images of one another. They extend rearwardly from the head tube 136 and diverge from one another to define a space 150 therebetween.

The head tube 136 includes two apertures 140 and 141. Aperture 140 is located at the front of the head tube 136 to define an air inlet. A foam air filter (not shown) covers the aperture 140 to keep the engine air clean. The plenum 116 is attached to the aperture 141 at the rear side of the head tube and extends into the space 150. The plenum 116 couples the air inlet through the head tube 136 with the engine inlet 310. Further, a number plate (FIG. 3, number 142) is used to cover the air filter. Thus, the air inlet is very high on the bike, which helps keep the engine air cool and clean.

Referring to FIGS. 4 and 6, the left and right swing arm mounts 145 extend downwardly from the rear ends of the spars 138a,b and are attached thereto. The swing arm mounts 145 are curved into a C-shape. The swing arm 208 is coupled to the frame 118 at the swing arm attachment points 209, which also define the attachment point for the engine 114.

The cross members 142, 144, and 146 add rigidity to the main frame 128. The head cross member 142 extends between the spars 138a,b closest to the head tube 136. The shock cross member 144 extends between the spars 138a,b spaced from the head cross member 144 near the rear ends of the spars 138a,b. The peg cross member 146 extends between the swing arm mounts 140a,b near the lower curved end. The head and shock cross members 142 and 144 preferably have a triangular cross-section. The peg cross member 146 preferably has an oval cross section.

The shock cross member 144 includes left and right upper subframe mounts and left and right shock mounts. Each upper subframe mount is a tab, which extends upwardly from the shock cross member 144 upper surface adjacent the left or right spars 138a,b, respectively. These mounts support the subframe 130, which supports the seat 125 and rear plastics 124.

As shown in the embodiment in FIG. 3, the movable engine frame 134 supports the engine 114 and the air intake assembly 116. The engine frame 134 includes at least one down tube extending from the main frame. Preferably, the engine frame has one down tube 235. The down tube 235 is pivotally attached at spaced longitudinal locations on the spar 138a.

Extending from the down tube 235 is a mounting tube 244. The mounting tube 244 transversely extends from an upper surface of the down tube 235. The tube 244 extends through the engine 114 to secure the engine 114 to the engine frame 134. The engine is further coupled to the main frame 112 by a single fastener that extends through the swing arm mounts 209.

As best seen in FIG. 4, the engine 114 extends vertically between the spars 138a,b. In an out position, the down tube 235 of the engine frame 134 is spaced from the main frame 112, so that the engine 114 is accessible and removable.

The frame 112 is formed of aluminum. One suitable aluminum is commercially available 6000 series aluminum. The spars, gussets, swing arm mounts, and swing arm lugs are cast, extruded or forged. Preferably, the main frame head tube, cross members, subframe, bolt rails are extruded and machine finished. These components are welded together. The main frame and swing arms may be formed as one piece or two pieces. If these components are two pieces, each piece is a mirror image about the longitudinal axis and are welded together. These are set forth in more detail in assignee's co-pending U.S. application Ser. No. 09/073,925, which is incorporated herein by reference.

Figure 4A:
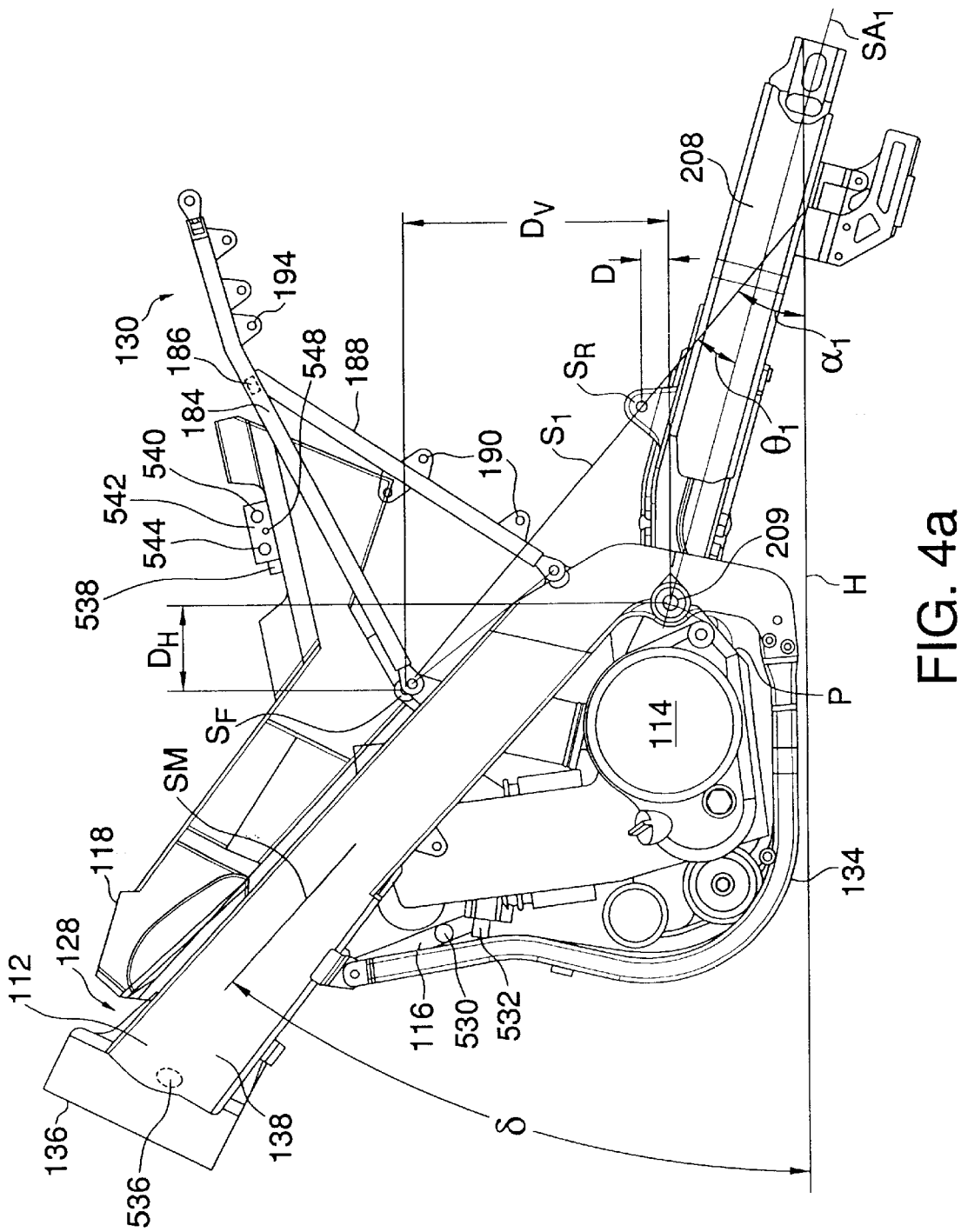
FIG. 4a is a left side view of the motorcycle frame showing various relations between the components.

Referring to FIG. 4a, the subframe 130 supports the seat 125 and back portion of the gas tank 118, and includes left and right upper rails 184, a subframe cross member 186, and left and right lower rails 188. The left and right upper rails 184 are spaced apart and parallel to one another. The subframe cross member 186 adds rigidity to the subframe 130, and connects the left and right rails 184 to one another near their rear ends. The lower rails 188 are fixed by welding to the upper rails 184, and extend angularly downwardly therefrom.

Figure 20:
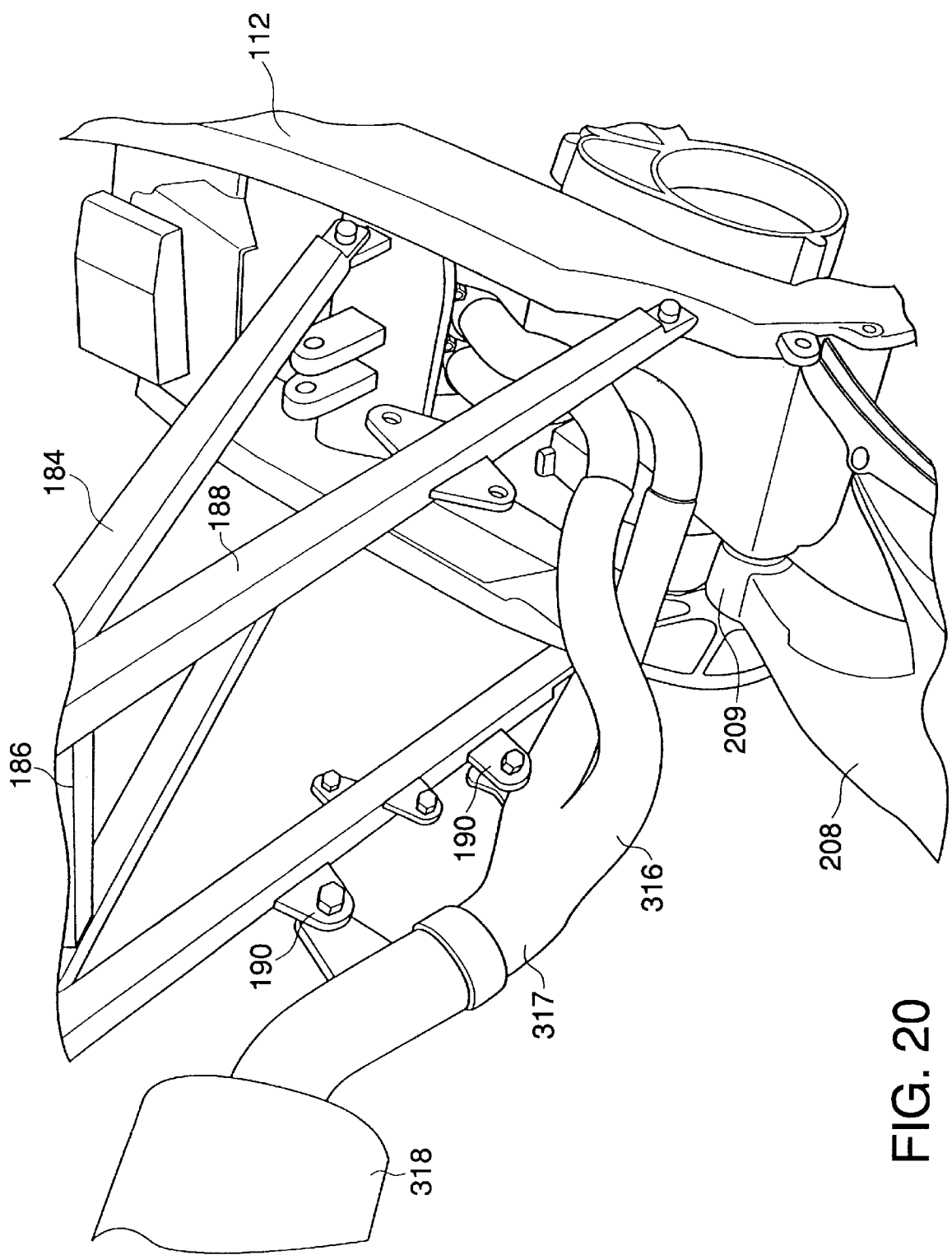
FIG. 20 is a rear perspective view of the exhaust system extending from the engine.

The upper and lower subframe tabs 190 and 194 support the exhaust pipe and muffler as shown in FIG. 20 below. Each of the subframe rails 184 and 188 have a rectangular cross section and the free ends narrow to terminate in subframe connectors. The subframe 130 is connected to the main frame 128 so that the rails 184 and 188 extend rearwardly from the main frame 128. The front ends of the upper rails 184 attach to the main frame 128 when the connectors are coupled to the upper subframe mounts. The lower rails 188 connect to the spars 138 when the connects are attached thereto. Conventional fasteners are used to connect the subframe 130 to the main frame 128.

As discussed in more detail below, the engine 114 is four-stroke engine with a cylinder 300 in fluid communication with the air intake assembly 116. The engine 114 has an electronic fuel injector instead of a carburetor. This allows the engine 114 to have a vertical arrangement that extends from the engine frame 134 upward. The portion of the cylinder 300 block shown in phantom extends between the spars 138a,b in the space 150.

Referring to FIGS. 4 and 5, the air intake assembly 116 includes an air filter (not shown), an inlet aperture 140 in the front of the head tube, an outlet aperture 141 in the back of the head tube, a plenum 143 and engine air inlets 310. The air filter prevents dust and dirt from getting sucked into the engine where it can cause harm. The engine 114 is positioned below the air filter. The air plenum 143 has a first end 143a that is disposed between the right and left spars 138. The first end 316 is flared upwardly to create a flange. The opposite end 320 of the plenum 143 is connected to the engine 114 at engine air inlets 310. The plenum 143 introduces an air stream into the housing (not shown) and transports it toward the engine 114. The fuel injector (not shown) receives fuel from the fuel tank 118 and injects the fuel into the air stream flowing within the air inlet 310 through apertures 302. The fuel is injected at a predetermined pressure, angle, and amount to produce a fuel/air mixture that is introduced into the engine 114. The ratio of fuel to air in the fuel/air mixture is controlled by the electronic controller 122. The controller 122 is in electronic communication with the fuel injectors as discussed in more detail below.

Figure 7:
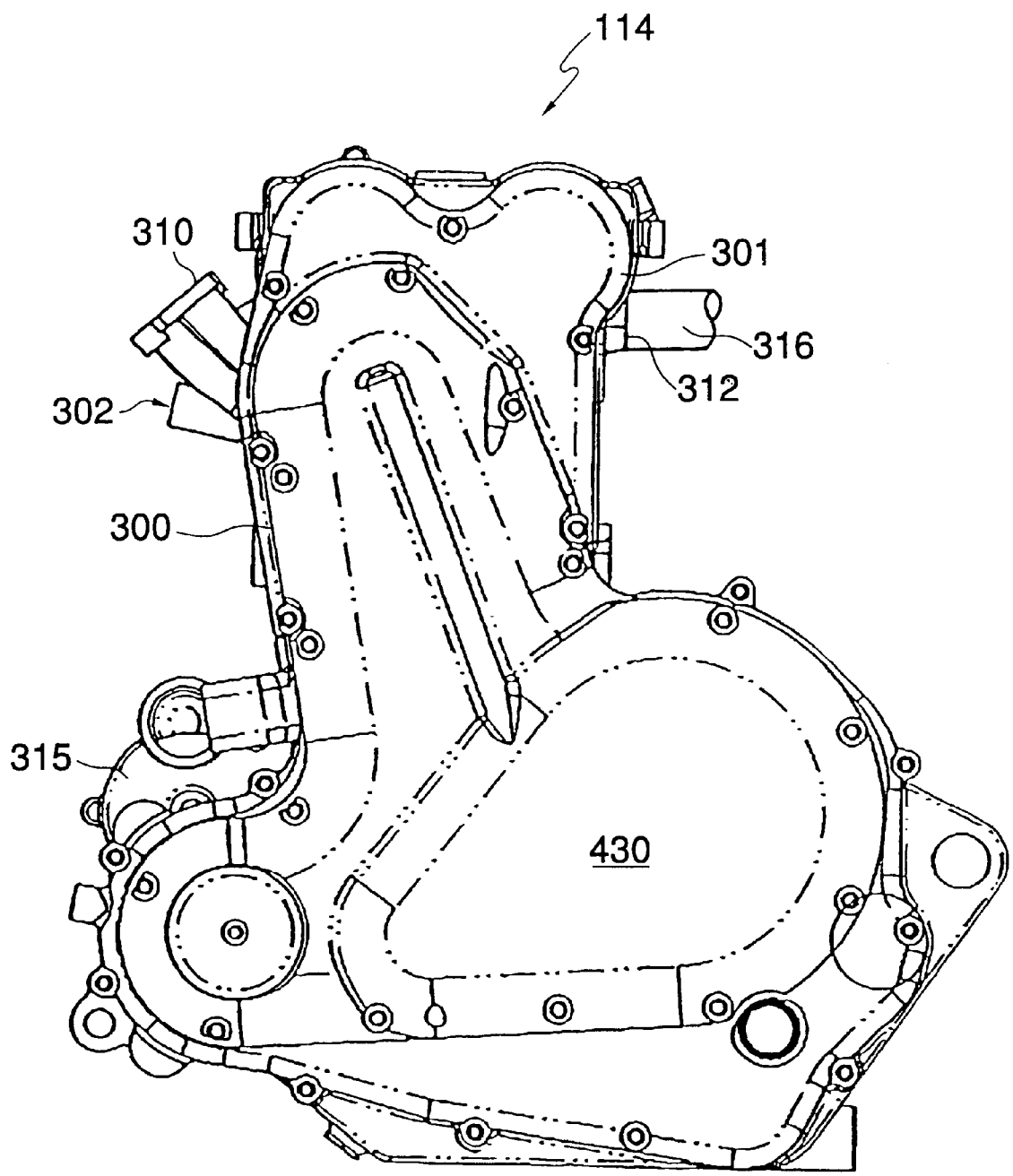
FIG. 7 is a side view of a four-stroke engine according to the present invention.
Figure 8:
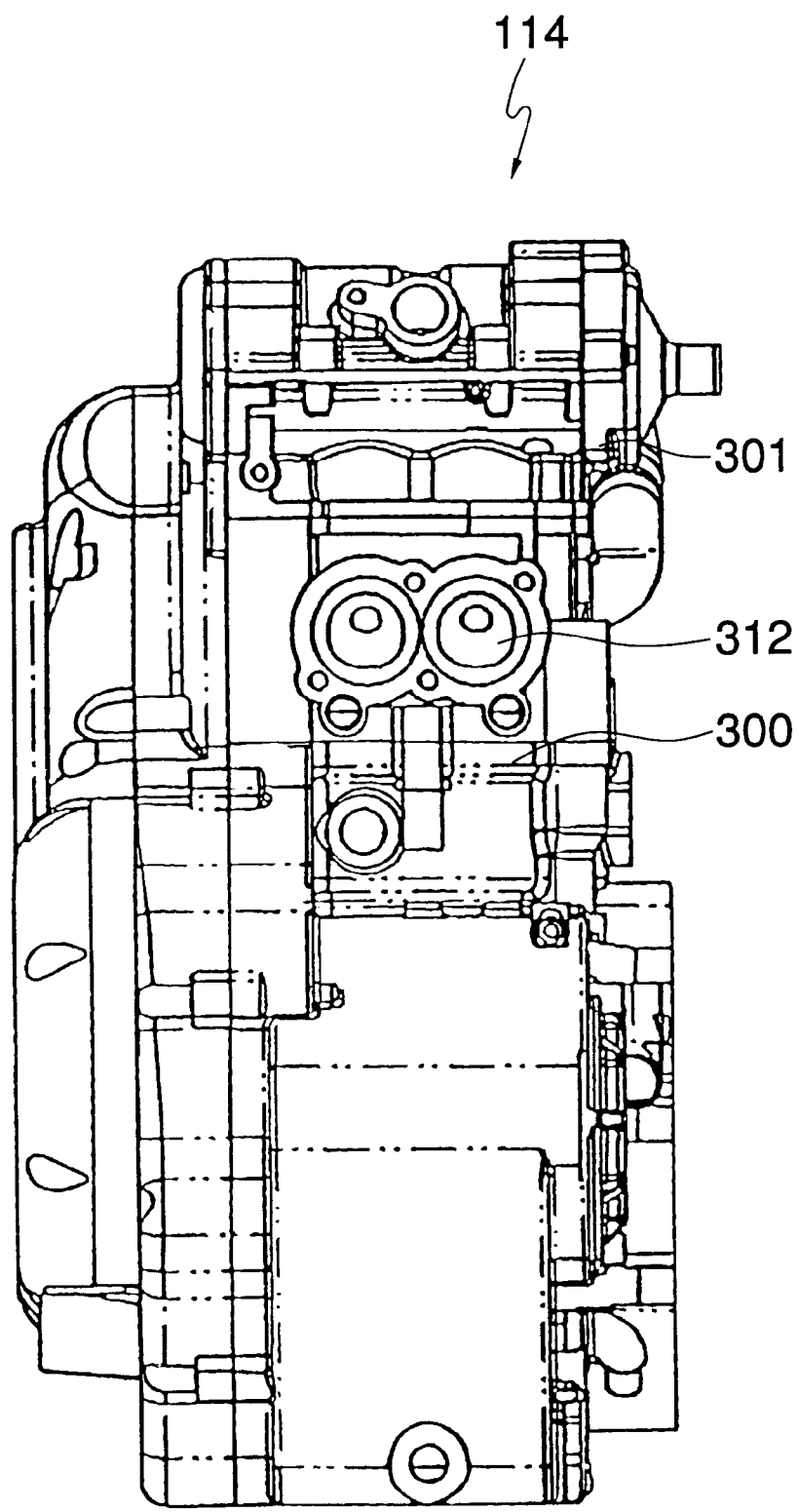
FIG. 8 is a back view of the four-stroke engine of FIG. 7.
Figure 9:
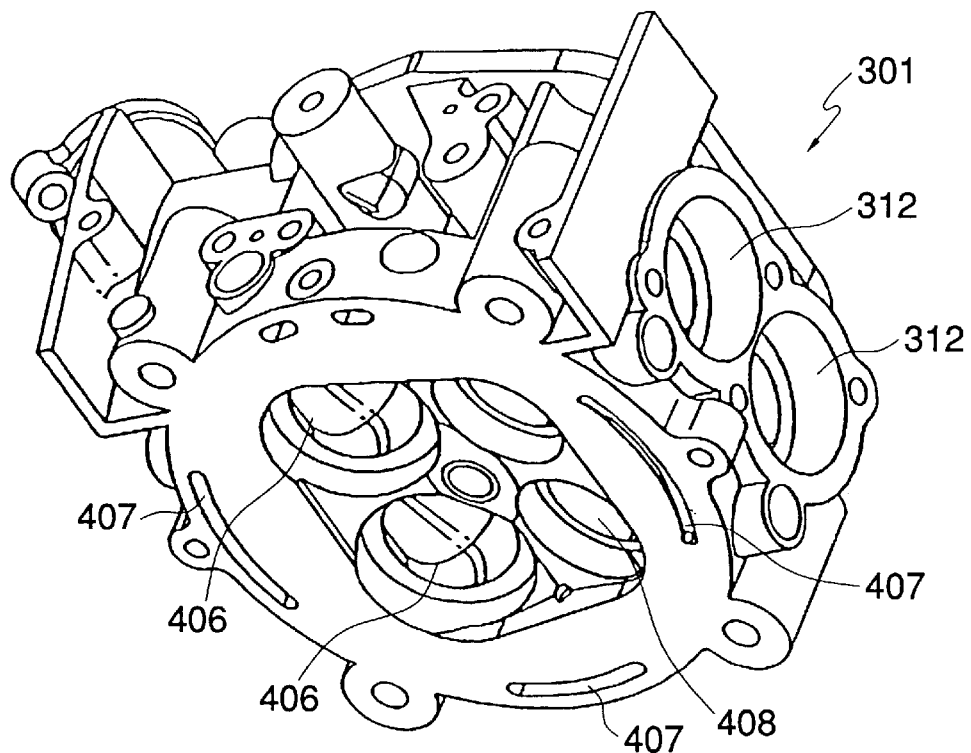
FIG. 9 is a back, bottom perspective view of the cylinder head according to the present invention.
Figure 10:
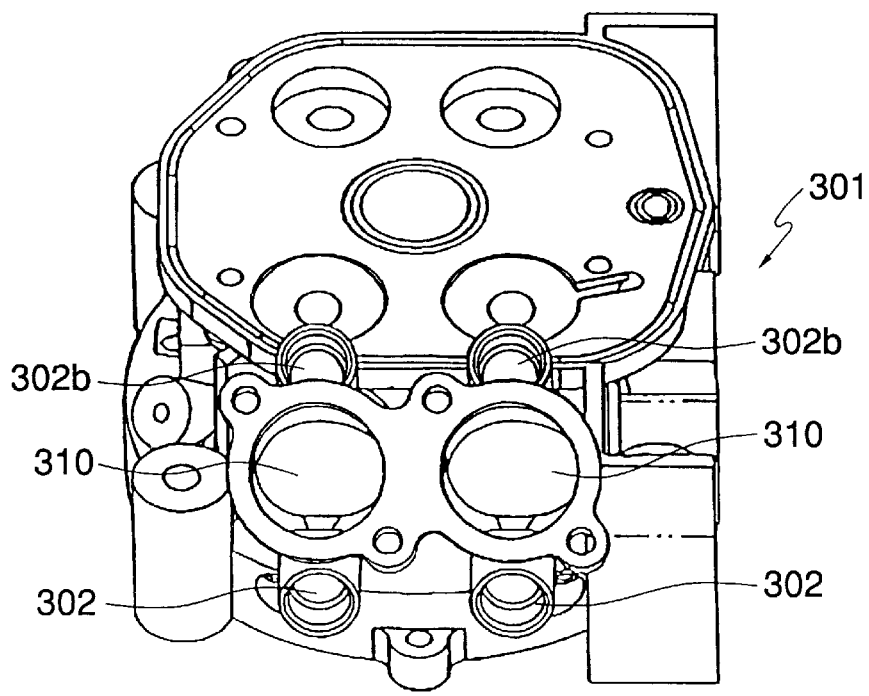
FIG. 10 is a back, top perspective view of the cylinder head of FIG. 9.
Figure 11:
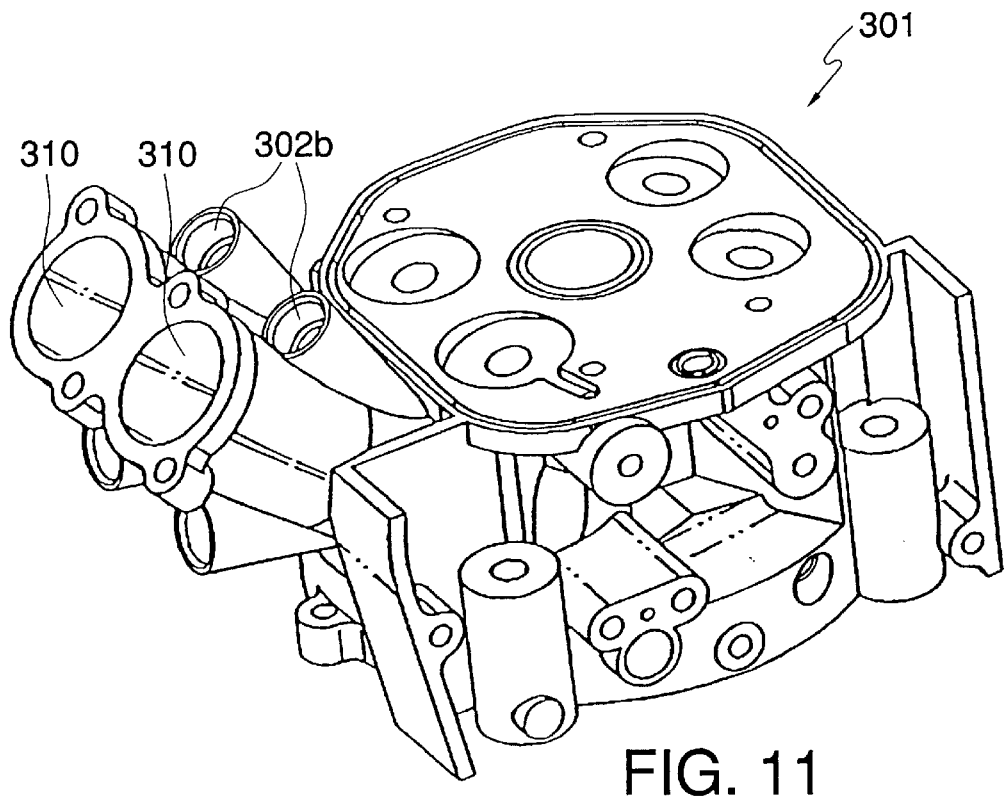
FIG. 11 is a front, top perspective view of the cylinder head of FIG. 9.
Figure 12:
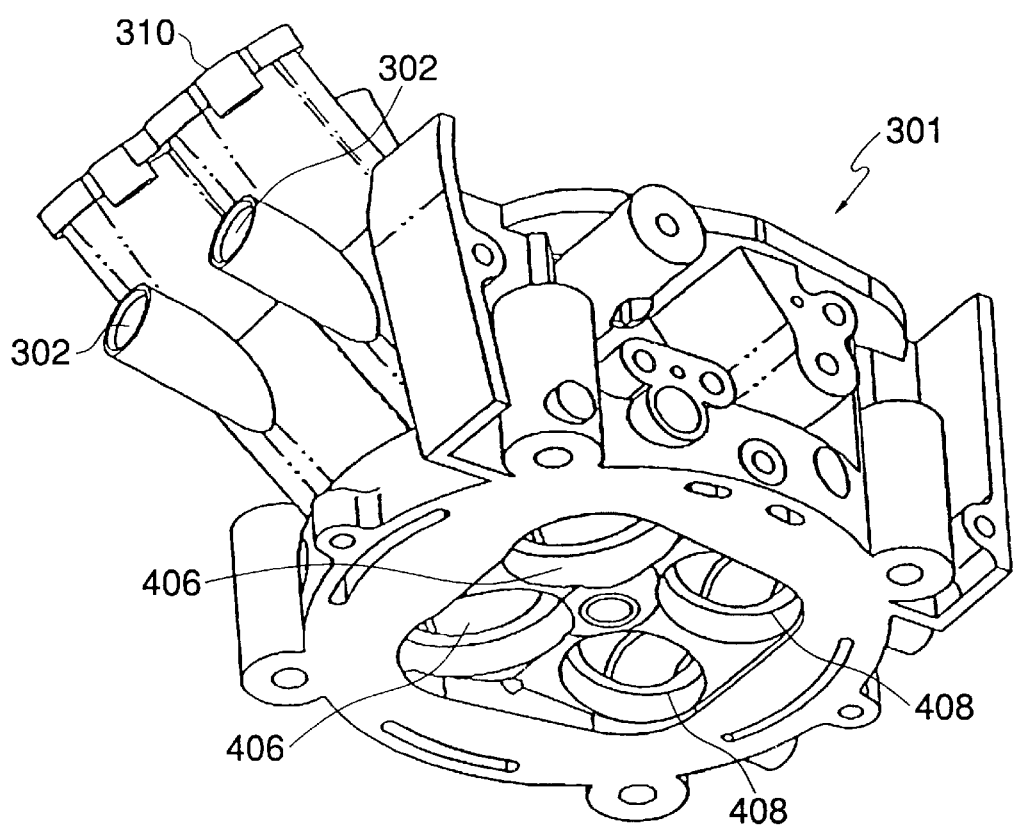
FIG. 12 is a front, bottom perspective view of the cylinder head of FIG. 9.

Turning now to the four-stroke engine according to the present invention, reference is now made the engine 114 shown in FIGS. 7 and 8 and the cylinder head 301 shown in FIGS. 9–12. The engine 114 is a four-stroke engine having a single cylinder 300 that has an internal volume between 250 cc and 700 cc. Most preferably, the engine has an internal volume of about 400 cc. Basically, the engine comprises a cylinder 300 and a cylinder head 301 coupled to the top of cylinder to form a substantially closed volume. A piston, discussed below, traverses within the closed volume. The cylinder head 301 has the two inlets 310 for receiving air and two inlets 302 (or 302b) for introducing fuel from fuel injectors. The air and fuel are mixed and traverse through inlet ports 406 for introducing the air/fuel mixture into the cylinder chamber.

The cylinder head 301 also has two outlets 408 for allowing exhaust products to be removed from the closed volume. The exhaust products leave the engine through apertures 312 on the back side of the engine 114 as shown in FIG. 7. An exhaust pipe 316 extends from the back side of the engine and extends back toward the rear of the bike.

Moreover, the cylinder head includes a plurality of apertures 407 extending through the outer wall of the cylinder head 301. Preferably, water from a radiator is pumped in a downward direction through the apertures to cool the cylinder head. The water is then extracted trough a port 432 in the cylinder 302.

Furthermore, the engine 114 according to the present invention includes an electronic starter 315 and does not include a standard kick-start. As discussed above and in assignee's co-pending application Ser. No. 09/073,925, the frame spars can be designed in a substantially straight plane extending from the head tube to the swing arm mounts for improved structural stability.

Figure 13:
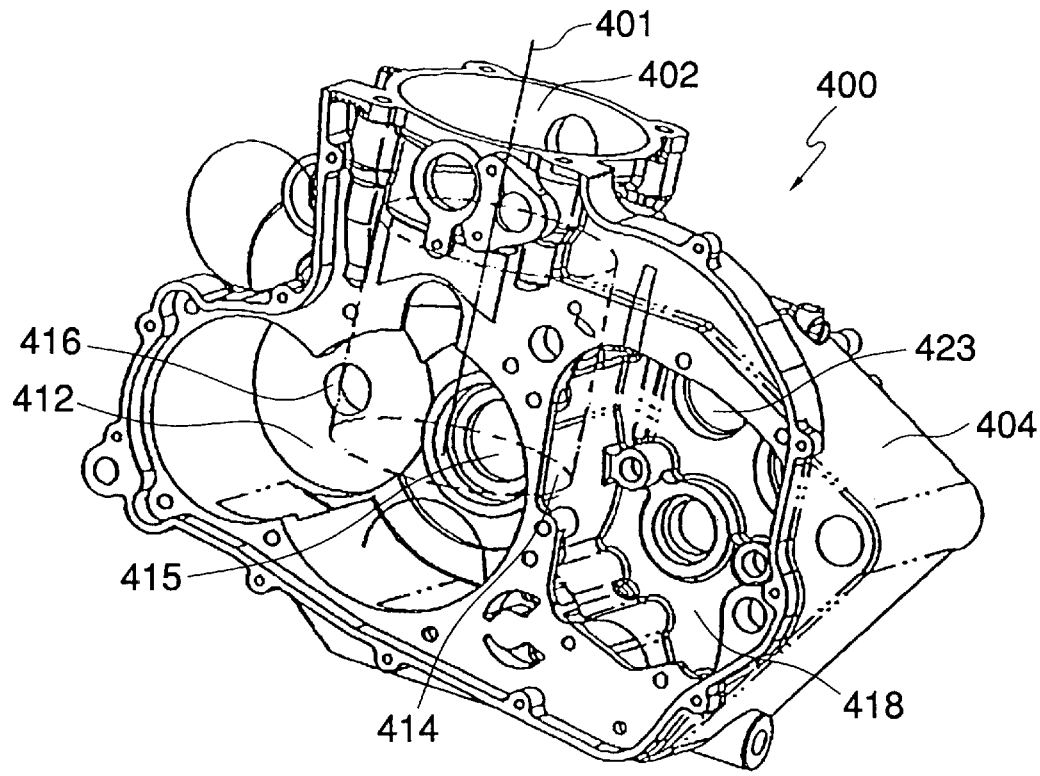
FIG. 13 is a back, left perspective view of a cylinder and crank case according to the present invention.
Figure 14:
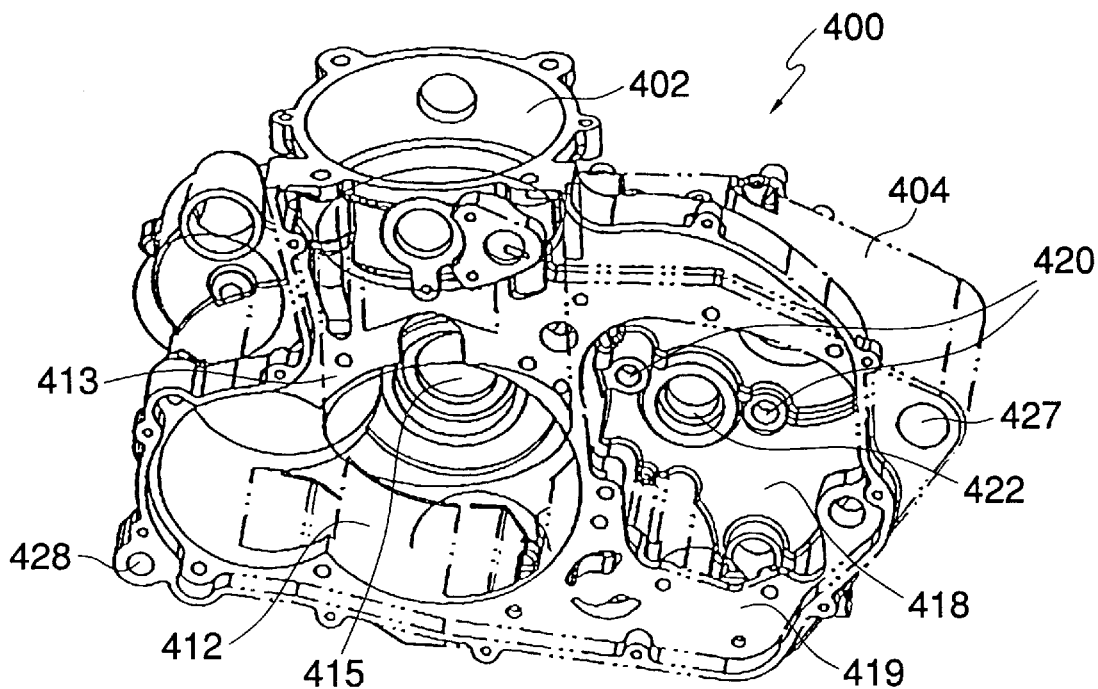
FIG. 14 is a top, left perspective view of the cylinder and crank case of FIG. 13.
Figure 15:
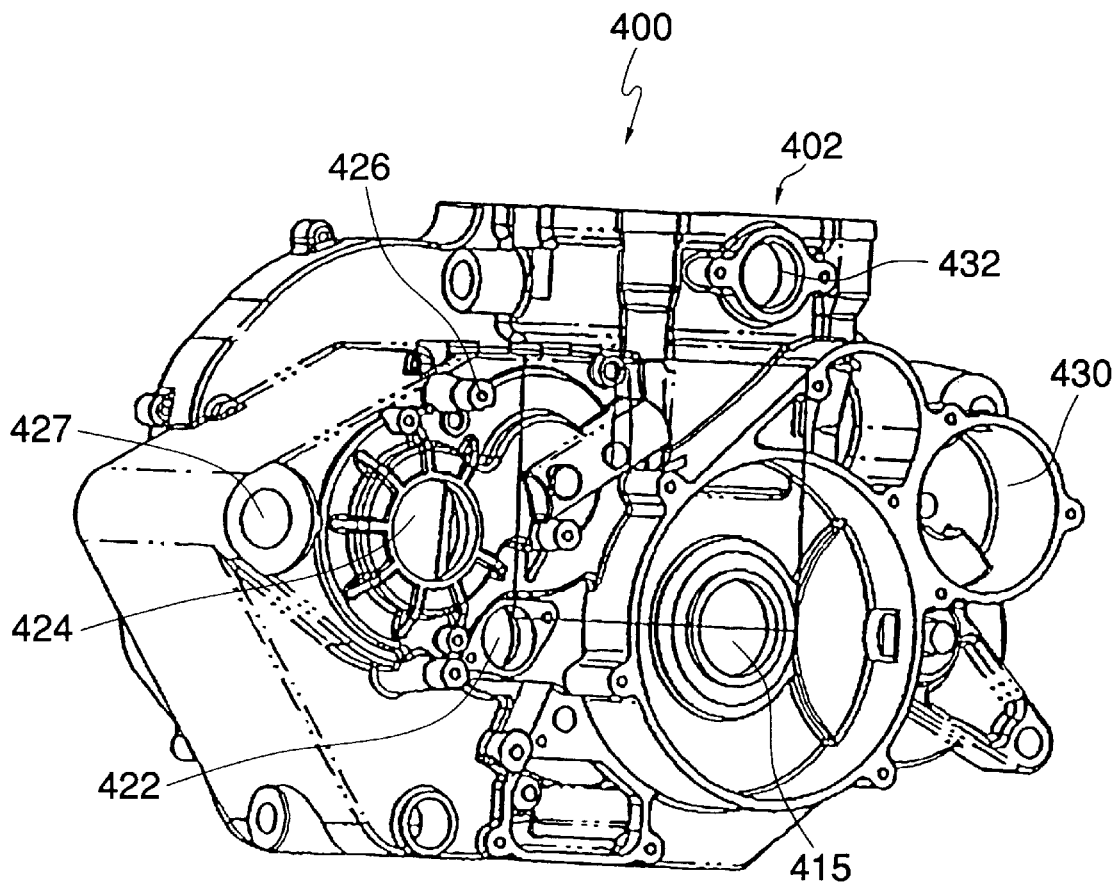
FIG. 15 is a back, right perspective view of the cylinder and crank case of FIG. 13.
Figure 17:
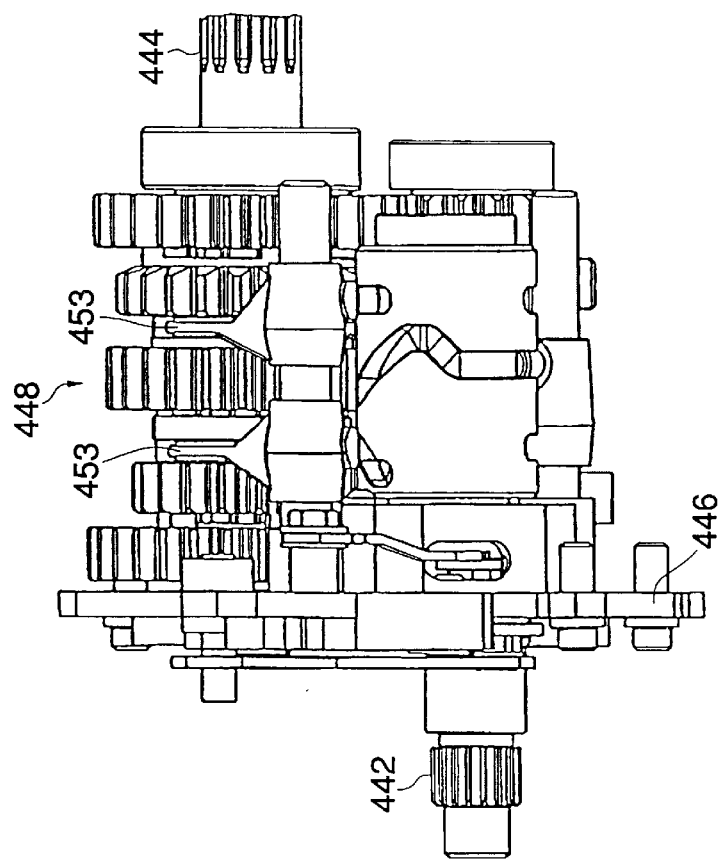
FIG. 17 is a back view of the transmission cartridge of FIG. 16.
Figure 16:
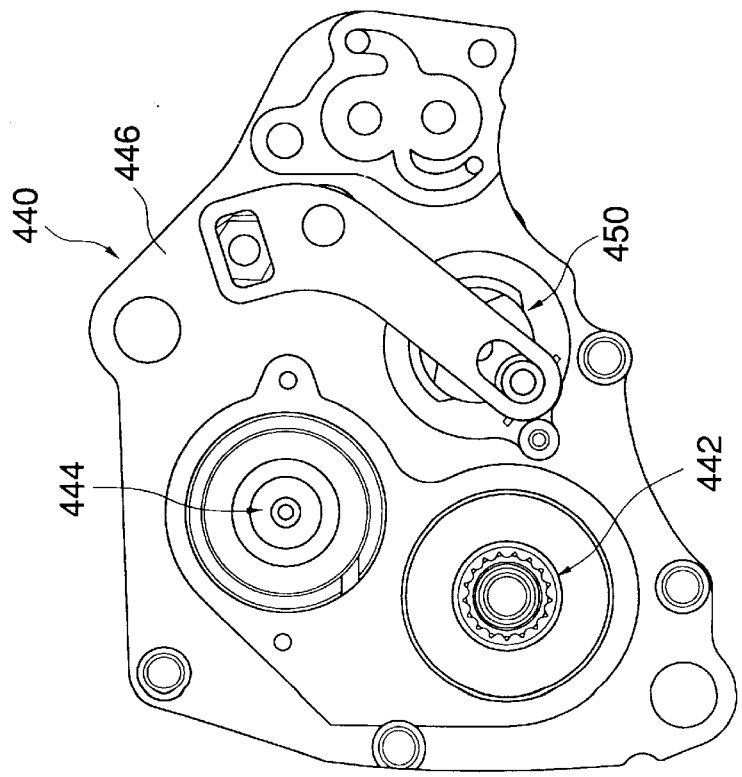
FIG. 16 is a left side view of the transmission cartridge according to the present invention.
Figure 18:
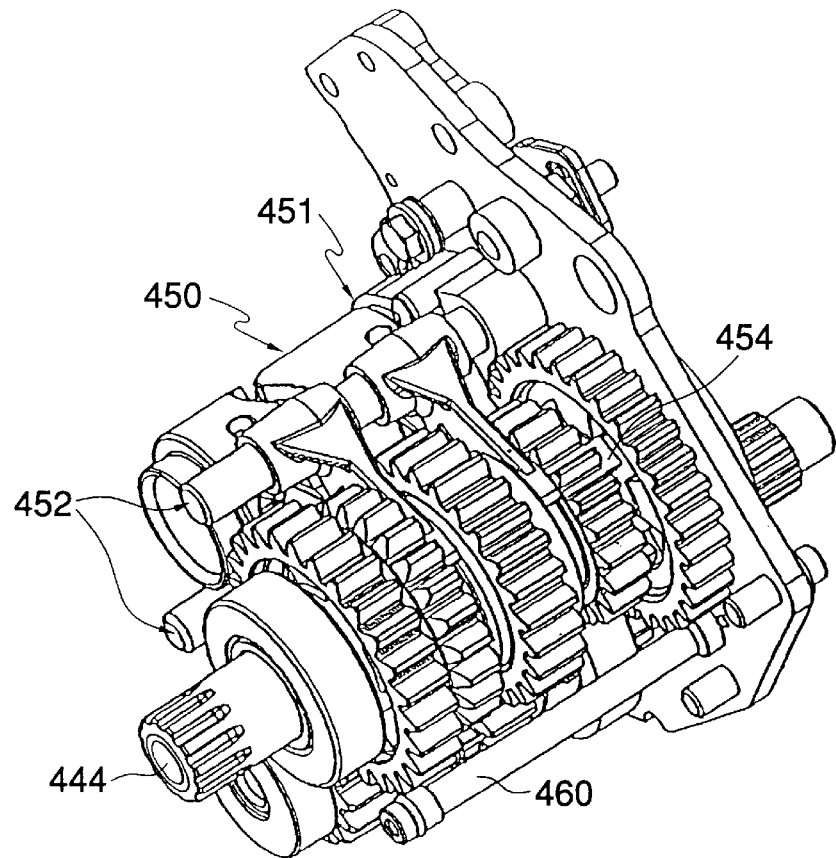
FIG. 18 is a top, right perspective view of the transmission cartridge of FIG. 16.
Figure 19:
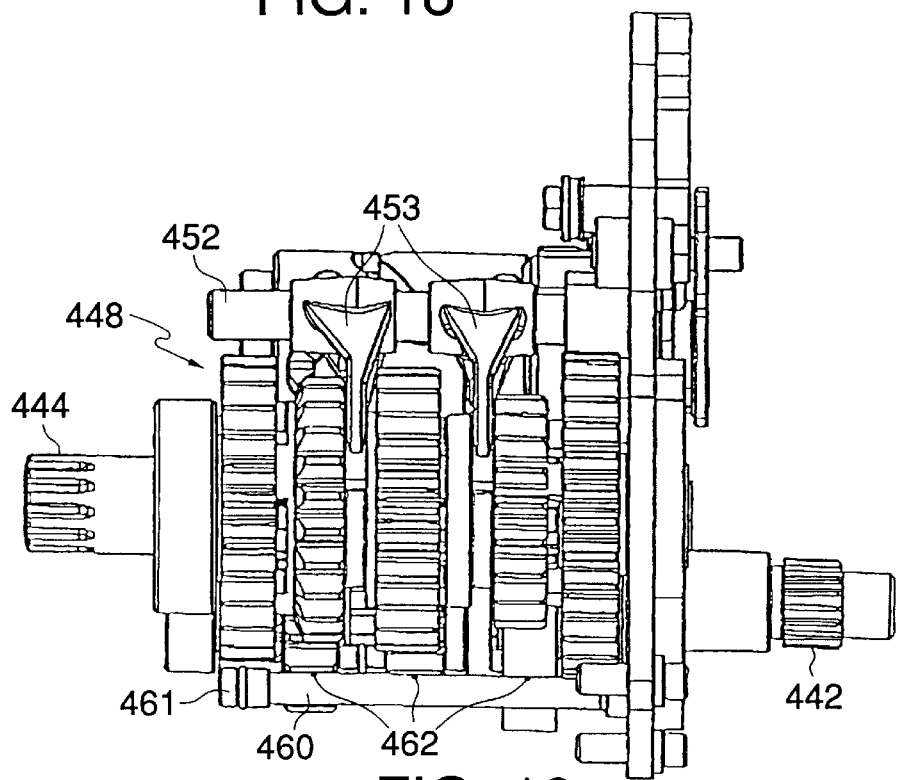
FIG. 19 is a top view of the transmission cartridge of FIG. 16.

Turning now to FIGS. 13–15, the engine 114 preferably has a monocoque cylinder and crank case 400. In most engines the cylinder is comprised of two halves bolted together and they are then bolted to a crank case. In the present invention, the monocoque cylinder and crank case 400 is a single cast piece comprising the cylinder 402 and the crank case 404. The cylinder head 301 is bolted to the monocoque cylinder and crank case 400.

The engine piston is received within the cylinder 402 of the monocoque 400 along with a cylinder liner. The piston and cylinder share the same centerline 401 and have the same radius. As is known in the art, coupled to the bottom of the piston is a con rod which is coupled to the crank and crank shaft. Piston rings are provided for making sure that the piston substantially fits within the cylinder 402. As is well known in the art, the piston provides the power for the crank shaft through the combustion of the air and fuel mixture within the cylinder 402. Air and fuel are introduced into the cylinder 402 through inlet ports 406 in the cylinder head which are opened and closed with valves. The piston traverses upward inside the cylinder to compress the air-fuel mixture which is then ignited to provide an internal combustion. The internal combustion pushes the piston downward within the cylinder and then the cylinder travels back up and the exhaust valves are opened so that the exhaust can be expelled from the closed cylinder through exhaust ports 408. At the top of the stroke, the inlet valves are then opened again and the exhaust valves closed so that more air and fuel can be introduced into the cylinder.

The monocoque cylinder and crank case 400 includes a first cavity 412 for the crank shaft and balance shaft, i.e., a crank assembly cartridge. The first cavity 412 has a periphery 413 to which the crank assembly cartridge is attached. Aperture 415 receives a first end of the crank shaft and aperture 416 receives a first end of the balance shaft. A wall 414 separates the crank assembly cavity 412 from a second cavity 418 for the transmission cartridge (discussed in more detail below). The second cavity has an outer periphery 419 to which a transmission cartridge is attached. In the cavity 418 is a first set of apertures 420 for receiving first ends of the shift fork rods. Another aperture 422 receives a first end of the shift drum shaft and aperture 423 receives a first end of a clutch drive shaft. Yet another aperture 424 receives a first end of chain drive shaft, which extends there through to provide power to the motorcycle chain. By separating the crank assembly from the transmission, separate oil can be used in the crank assembly and the transmission. Preferably, motor oil is used in the crank assembly and transmission oil is injected into the transmission through aperture 426 to cool and lubricate the transmission. This improves the durability of the transmission which, in the prior art, is generally lubricated with motor oil that can break down and contain debris.

Furthermore, the monocoque cylinder and crank case 400 includes mounts 427 and 428 for attaching the engine to the frame. Aperture 430 on the right side of the monocoque 400 receives the starter for electronically starting the engine.

FIGS. 16–19 disclose a transmission cartridge 440 according to the present invention. The transmission cartridge is comprised of a clutch drive shaft 442 and a chain drive shaft 444 that are coupled to a cartridge plate 446. In this manner, the entire transmission can be assembled and then inserted into the cavity 418 of the monocoque cylinder and crank case and the plate 426 secured to the left side periphery 419 thereof. This permits easy removal and repair of the transmission. The gear on the crank shaft is coupled to the clutch basket as known by those of ordinary skill in the art, which provides power input to the clutch drive shaft 442.

The transmission cartridge further includes a plurality of gears 448, a shift drum 450 and shift fork rods 452 for changing gears. As is know by those of ordinary skill in the art, the shift forks 453 are moved along the shift fork rods 452 to engage and disengage the gear cogs to change gears. The gears transfer power from the clutch drive shaft 442 to the chain drive shaft 444. Preferably undercut dogs such as 454 are used to improve the coupling between gears. As discussed below, a shift drum position sensor 451 is coupled to the shift drum 450 to monitor the engine gear and gear switching.

An oil spray bar 460 provides transmission oil into the second cavity 418 and includes a plurality of apertures 462 for spraying the transmission oil directly on each of the gears 448. The oil spray bar 460 is coupled to the oil inlet 426 in the monocoque housing 400 which is provided with pressurized transmission oil from a pump (not shown).

Referring back to FIG. 7, after the gearbox cartridge and the transmission cartridge are inserted into the engine cavities, a cover plate 430 is attached to the outer periphery of the engine left side to protect the engine.

Referring now to FIG. 20, exhaust pipe 316 is coupled to the engine to provide a passage for the engine's exhaust. According to the present invention, the exhaust pipe is coupled to the back end of the engine instead of the front and extends in a substantially backwards direction therefrom for the entire length of the exhaust pipe. Further, the exhaust pipe is preferably less than 50 inches long between the engine and the exhaust tip, including the collector 317 and muffler 318 portions. Most preferably, as shown, the exhaust extends from the back end of the engine in a substantially rearward and upward direction for its entire length and is less than about 45 inches. The exhaust pipe 316 is bolted to the back of the engine cylinder head and to the subframe at mounts 190.

The muffler portion 318 is coupled to the mounts 194 shown in FIG. 4a.

The present invention is also directed to an improved four-stroke engine that is particularly advantageous for the off-road motorcycle. The engine preferably comprises a single cylinder having an internal volume of between 250 cc and 700 cc and electronically controlled fuel injectors and ignition. The four-stroke motor also has an electronic control management system electronically coupled to the fuel injectors to control the amount and timing of the fuel injection with the air intake and ignition. The electronic control management system preferably is programmable and has more than one control map thereon so that different fuel injection/air intake control maps can be selected by the user for different riding conditions.

Referring back to FIG. 4a, a pair of fuel injectors 532 are provided to inject fuel from the fuel tank 118 and into the air flow entering the engine from the plenum 116. Coupled to the fuel injectors 532 and butterfly valve 530 is an electronic control management system ("ECM") generally depicted as 540 which includes an air temperature sensor 536 and air pressure sensor 538 and a program board (not shown). The air temperature sensor 536 is located within the inlet air chamber near the head tube to measure the temperature therein and the air pressure sensor 538 is positioned near the ECM to measure the ambient air pressure. The measurements from these sensors are electronically fed back to the ECM. Still further, the ECM includes a throttle position sensor on the butterfly valve 530. In other words, the throttle is coupled to open and close the butterfly valve. The throttle sensor is merely a position sensor on the butterfly valve to determine how open or closed the throttle is. A crank sensor, not shown, is coupled to the crank shaft to measure the engine speed for the ECM. Preferably, it provides a signal to the ECM based on the teeth of the generator flywheel, not shown, that mounts to the end of the crank shaft. These signals are fed to the ECM, which provides output signals to the fuel injectors to control the fuel injection into the engine. The preferred fuel injectors 532 are Bosch fuel injectors. The ECM further includes an engine temperature sensor, not shown, which is preferably a water temperature sensor measuring the cooling water temperature before it returns to the radiator. Based on the power desired, which is provided from the throttle position sensor, and the input signals, the ECM system uses a control map to calculate proper control signals for the fuel injection and ignition timing.

In this embodiment, the ECM system is primarily provided on a plate which is coupled to the top of the gas tank or the cylinder head. Moreover, the ignition coil and the spark plug extend down into the cylinder for igniting the air/fuel mixture for combustion. The ignition coil is coupled to the ECM to receive signals therefrom.

In a most preferred embodiment of the invention, the program board receives the input signals from the throttle position sensor, the RPM or crank shaft sensor, the engine temperature sensor, and the air pressure and then provides fuel and ignition control signals to the fuel injectors and ignition coils respectively based on these input signals and the programmed control map. The board is preferably programmed with more than one control map for providing fuel and ignition control signals to the engine such that the user can readily switch between control maps. More particularly, for example, a control map can be provided for dry conditions and a separate control map can be provided for muddy conditions and a switch on the handle bars can be provided for switching between these two control maps. In this manner, when the user shows up to a track early in the morning when the track is in muddy conditions, the user can select a first, muddy control map which would preferably provide less low end torque and then, in the afternoon when the track dries up, can readily switch to a second, dry conditions control map which will provide higher torque at the low end. Still further, an infrared reader 548 can be coupled to the board so that a user can modify or make different control maps on his computer and quickly download them onto the control board for readily changing the control maps of the fuel injection and ignition.

In a preferred embodiment of the invention, the ECM includes an ignition interrupt, whereby the spark to the engine is stopped during gear changes such that there is little load on the transmission and gear changes are much easier and smoother. In the preferred embodiment, the ECM system includes a shift drum position sensor to provide a signal when the user is changing gears and the electronic control management system shuts down the ignition spark during the gear change.

Still further, in a preferred embodiment of the invention, the electronic control management includes separate ignition timing for each gear such that the lower gears can have an advanced ignition timing based on piston position such that the bike can accelerate faster through low gears and then a retarded timing is used for the higher gears where acceleration has slowed. Most preferably, the electronic control management system includes at least one base map (as stated above different base maps can be used for different riding conditions) and then a gear modifier to make the ignition timing gear specific. Preferably, the shift drum position sensor provides a signal to the ECM indicating which gear the engine is in and the gear modifier moves ignition timing inversely proportional to the gear, i.e., first gear has the most advanced timing (earliest or lowest in the piston stroke) and the highest gear has the most retarded timing. Most preferably, the ignition timing with regard to piston position changes for each gear such that the timing is less advanced or more retarded for each higher gear. That is the ignition timing occurs at a higher point in the piston travel for each higher gear. As is well known in the art, advanced timing is when the ignition takes place during the up stroke of the piston, before the piston reaches the base position, and retarded ignition takes place during the up stroke of the piston, after the base position and before the piston reaches top-dead-center. Therefore, more advanced ignition means that the piston is further away from top-dead-center in the stroke.

Still further, the engine of the present invention preferably includes a cam sensor that provides the ECM with a cam location and speed signal. Although the speed signal is somewhat redundant to the crank shaft sensor, the cam position sensor indicates to the ECM where in the four-stroke cycle the piston is in. This is particularly important during starting when it is undesirable to have ignition during the exhaust stroke as opposed to the compression stroke (both upward movements of the piston). Generally on a single cylinder engine, this could cause backfire. Thus, the cam position sensor can make sure that the start-up ignitions are in the proper timing of the four-stroke cycle.

The improved four-stroke engine preferably has only an electronic starter. Preferably, the starter is coupled to a first end of the engine motor balance shaft. By eliminating the standard kick-starter, the frame spars can be significantly improved as stated in more detail below.

The invention is also directed to an engine with an electronic control management system that allows for after market tuning. While the electronic control management system automatically compensates for air temperature and pressure, consumers may buy after market parts and may want to change the fuel map or ignition timing. The present invention adds a pig tail connector/harness that plugs into a connector 544 on the electronic control management system 540. When plugged in, the electronic control management system is programed to know that the engine is in either a service or tuning mode and the user can select the mode with a switch on the pig tail connector/harness. In service mode, the electronic control management will signal if there is a malfunction such as bad sensor. In the tuning mode, the engine is started in neutral and then the electronic control management system potentiometer 542 is altered to adjust the idle. Then the engine can be switched into gear to adjust the low, mid and high range fuel characteristics. For example, the engine can be placed into second gear and the potentiometer 542 adjusted to adjust the low range fuel characteristics. Then the engine can be switched into third gear and the potentiometer 542 altered to change the mid range fuel characteristics. Finally, the engine can be switched into fourth gear and the potentiometer 542 altered to change the high range fuel characteristics. Preferably, a signal from the throttle sensor can be used to save the changes and then the engine is tuned to the users desires.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments which would come within the spirit and scope of the present invention.

What is claimed is:

1. A four-stroke engine comprising:
   a) only a single cylinder having a predetermined radius, centerline, a first end and a second end and an internal volume of between 250 cc and 700 cc;
   b) a piston received within the cylinder having substantially the same radius and being able to substantially transverse within the cylinder from the first end to the second end; and
   c) a cylinder head coupled to the cylinder at the first end to form a substantially closed volume with the piston, the cylinder head having at least one inlet with a corresponding inlet valve for introducing air and at least one fuel injector for injecting fuel into the closed volume and at least one outlet with a corresponding outlet valve for expelling exhaust products from the closed volume;
   wherein the inlet is formed on a front side of the engine and the outlet is formed on a back side of the engine.

2. The four-stroke engine of claim 1, further comprising:
   a) an electronic control management system electronically coupled to each fuel injector to control the amount and timing of the fuel injection into the closed volume and to an ignition coil and a spark plug for controlling the ignition within the closed volume by selectively igniting the air and fuel therein, the electronic control management system comprising:
      (a) an air temperature sensor positioned for measuring air temperature flowing into a butterfly housing;
      (b) an air pressure sensor positioned for measuring air pressure;
      (c) a transmission sensor positioned within a transmission of the engine for determining which gear the transmission is in; and
      (d) a programmed board for receiving input signals from the air temperature sensor, the air pressure sensor and the transmission sensor and providing control signals to the fuel injectors and ignition coil based on the input signals.

3. The four-stroke engine of claim 2 wherein the programmed board contains at least two different fuel injector control maps for providing control signals, the fuel injector control maps being selectable by a user.

4. The four-stroke engine of claim 3 wherein the electronic control management system further includes means for electronically coupling the programmed board to a computer such that the fuel injector control maps can be changed with the computer.

5. The four-stroke engine of claim 1, further comprising and exhaust pipe coupled to the outlet of the engine and extending in a substantially backwards direction therefrom for the entire length of the exhaust pipe.

6. The four-stroke engine of claim 5, wherein the exhaust pipe has an entire length of less than about 50 inches.

7. The four-stroke engine of claim 2, wherein the electronic control management includes an ignition interrupt, whereby the ignition within the control volume is stopped during gear changes.

8. The four-stroke engine of claim 7, wherein the electronic control management system includes a shift drum position sensor to provide a signal to the electronic control management when the user is changing gears.

9. The four-stroke engine of claim 2, wherein the engine has a plurality of gears and wherein the electronic control management is programmed to provide different ignition timing for each gear.

10. A four-stroke engine comprising:
    d) only a single cylinder having a predetermined radius, centerline, a first end and a second end and an internal volume of between 250 cc and 700 cc;
    e) a piston received within the cylinder having substantially the same radius and being able to substantially transverse within the cylinder from the first end to the second end;
    f) a cylinder head coupled to the cylinder at the first end to form a substantially closed volume with the piston, the cylinder head having at least one inlet with a corresponding inlet valve for introducing air and fuel into the closed volume and at least one outlet with a corresponding outlet valve for expelling exhaust products from the closed volume; and
    an exhaust pipe coupled to the outlet of the engine and extending in a substantially rearward and upward direction therefrom for the entire length of the exhaust pipe, and the entire length being less than about 45 inches;
    wherein the inlet is formed on a front side of the engine and the outlet is formed on a back side of the engine.

* * * * *